Jan. 15, 1957 H. BURGEFF 2,777,757
VESSEL FOR CONTINUOUS EXTRACTION
Filed June 24, 1952

INVENTOR
HANS BURGEFF

BY *Rudolph S. Bley*
his ATTORNEY

United States Patent Office 2,777,757
Patented Jan. 15, 1957

2,777,757

VESSEL FOR CONTINUOUS EXTRACTION

Hans Burgeff, Wurzburg, Germany

Application June 24, 1952, Serial No. 295,264

1 Claim. (Cl. 23—267)

This invention relates to a process and a vessel for the continuous extraction of any desired materials at room or increased temperature, more particularly for chemical and micro-biological purposes.

The process is based on the idea, that cooling produced by evaporation causes a continuous condensation of an extraction liquid in such a manner that the condensed drops that are formed drop out at measurable intervals of time from the material subjected to extraction. For this purpose the evaporated liquid is condensed by a cooling surface and this condensed liquid is supplied in drops to the material subjected to extraction.

In carrying out the process, use is made of a vessel, for instance a glass jar, the cover of which is provided with a funnel-shaped depression which is filled with water. The extraction liquid is filled into the jar and a small container of the material to be extracted is suspended or otherwise supported above the liquid.

Owing to the evaporation of the water in the cover the temperature of the latter is lower than that of the extraction liquid in the jar, for which reason the latter condenses on the inner conically tapered surface of the cover and drips into the extraction container.

The apparatus works also without water being filled in the cover, but only correspondingly slower, especially when working in daylight and the apparatus is placed on a dark support, for instance, black paper. In that case the light radiation increases the temperature of the solvent owing to conduction from the heated support.

Figure 1:
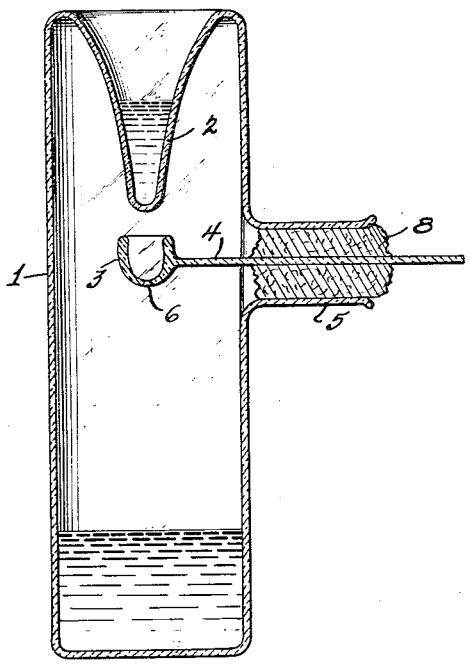
Figure 2:
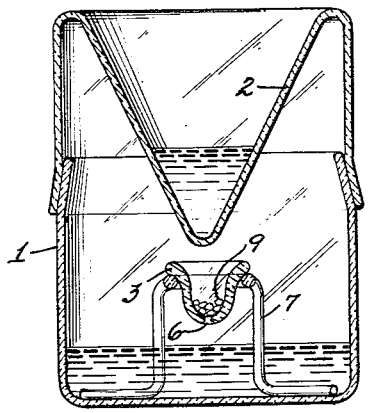

One example of the vessel for continuous extraction is illustrated diagrammatically and by way of example in the accompanying drawings, in which:

Figure 1 shows a closed glass vessel with a deep conical head and an extraction container mounted laterally; and Figure 2 is a two-part vessel in which the extraction container is mounted on an acid-proof support.

Referring to Figure 1, the vessel consists of the container 1 having a cover 2, which tapers inwardly to a point and which is filled with water to be evaporated. Underneath the conical point there is mounted a small extraction container 3, which is provided with an outlet opening 6 and the material 9 subjected to extraction is placed therein. The container 3 is mounted laterally on an arm 4 which is kept in position in a short pipe 5 through the intermediary of a clamped in packing 8.

The form of construction shown in Figure 2 is similar to that shown in Figure 1, but the cover 2 is removable and the extraction container 3 is supported on an acid-proof support 7.

The water of evaporation cools the inner wall of the cone 2, on which the evaporated extraction fluid condenses and falls in drops at the tip of the cone into the container 3, in order continuously to moisten the material 9 subjected to extraction. The extraction liquid then falls in drops through the opening 6 into the liquid at the bottom of the liquid. In this way a cycle of continuous extraction is obtained. The vessel may be made of any desired material, preferably glass.

The provision of water may be dispensed with if the extraction vessel is placed on a dark support which, due to light radiation, is heated the heat being communicated to the solvent by conduction.

I claim:

A vessel for the continuous extraction of chemical and microbiological materials comprising a container formed of glass in two parts, one of said parts being the top part and the other of said parts being the bottom part, said top part having a slightly outwardly flared skirt portion extending over and fitting against the inwardly tilted top portion of said bottom part, the inner surface of said skirt portion being lapped against said inwardly tilted top portion of said bottom part to form a lapped glass seal so that said container may be readily opened for removal of the contents from said bottom part, the upper one of said parts having a substantially conical depression extending down well into said container and formed integral therewith, said conical depression being adapted to hold a volatile liquid exposed to the outer atmosphere so as to permit said liquid to evaporate and cool surfaces of said substantially conical depression inside of said container, the bottom part of said container being adapted to receive a quantity of liquid therein, an extraction container for receiving the material to be extracted, means for supporting said extraction container beneath the lower-most part of said conical depression so that the vapor formed from the liquid in the bottom part of said container and condensing on the cooled bottom surface of said cone runs to said lower-most part thereof and drops into said extraction container, said extraction container having a perforation in the bottom thereof to allow the extract to drip therefrom.

References Cited in the file of this patent

UNITED STATES PATENTS 577,267   Painter _____ Feb. 16, 1897
1,875,937 Savage _____ Sept. 6, 1932

OTHER REFERENCES

Schaar and Co. Catalog, "Selected Laboratory Equipment," 754 W. Lexington St., Chicago 7, Illinois, page 251, catalog 50, 1950.

Morton (Laboratory Technique in Organic Chemistry), pages 202 and 204, McGraw-Hill Book Co., New York, 1938, 1st edition, 4th. imp.